(12) United States Patent
Herz et al.

(10) Patent No.: US 11,720,939 B2
(45) Date of Patent: Aug. 8, 2023

(54) RETAIL CHECKOUT TERMINAL FRESH PRODUCE IDENTIFICATION SYSTEM

(71) Applicant: TILITER PTY LTD, Parramatta (AU)

(72) Inventors: Marcel Herz, Parramatta (AU); Christopher Sampson, Parramatta (AU)

(73) Assignee: TILITER PTY LTD, Parramatta (AU)

( * ) Notice: Subject to any disclaimer, the term of this patent is extended or adjusted under 35 U.S.C. 154(b) by 378 days.

(21) Appl. No.: 16/906,248

(22) Filed: Jun. 19, 2020

(65) Prior Publication Data

US 2020/0364501 A1 Nov. 19, 2020

Related U.S. Application Data

(63) Continuation of application No. PCT/AU2018/051369, filed on Dec. 20, 2018.

(30) Foreign Application Priority Data

Dec. 21, 2017 (AU) .................................. 2017905146

(51) Int. Cl.
*G06T 7/00* (2017.01)
*G06Q 30/06* (2023.01)
(Continued)

(52) U.S. Cl.
CPC ............ *G06Q 30/06* (2013.01); *G06F 18/214* (2023.01); *G06F 18/24* (2023.01); *G06T 5/50* (2013.01);
(Continued)

(58) Field of Classification Search
CPC ... G06K 9/00; G06K 9/62; G06T 5/50; G06T 7/194; G06T 7/40; G06T 7/90
See application file for complete search history.

(56) References Cited

U.S. PATENT DOCUMENTS 5,963,667 A * 10/1999 Hashimoto ............ G06V 10/88
382/280
6,260,023 B1 7/2001 Seevers et al.
(Continued)

FOREIGN PATENT DOCUMENTS

WO 2009/091353 A1 7/2009

OTHER PUBLICATIONS

Dwibedi, Debidatta, Ishan Misra, and Martial Hebert. "Cut, paste and learn: Surprisingly easy synthesis for instance detection." Proceedings of the IEEE international conference on computer vision. 2017.*

(Continued)

*Primary Examiner* — Li Liu
(74) *Attorney, Agent, or Firm* — Myers Wolin, LLC

(57) ABSTRACT

Disclosed are systems and methods including starting with a first number of images, generating a second number of images by digital operations on the first number of images, extracting features from the second number of images, and generating a classification model by training a neural network on the second number of images wherein the classification model provides a percentage likelihood of an image's categorisation, embedding the classification model in a processor and receiving an image for categorisation, wherein the processor is in communication with a POS system, the processor running the classification model to provide output to the POS system of a percentage likelihood of the image's categorisation.

26 Claims, 11 Drawing Sheets

(51) Int. Cl.

| | |
|---|---|
| *G06T 7/194* | (2017.01) |
| *G06T 7/90* | (2017.01) |
| *G06T 5/50* | (2006.01) |
| *G06T 7/40* | (2017.01) |
| *G06F 18/214* | (2023.01) |
| *G06F 18/24* | (2023.01) |
| *G06V 10/774* | (2022.01) |
| *G06V 10/82* | (2022.01) |
| *G06V 10/44* | (2022.01) |
| *G06V 20/52* | (2022.01) |
| *G06V 20/68* | (2022.01) |

(52) U.S. Cl.
CPC ............... *G06T 7/194* (2017.01); *G06T 7/40* (2013.01); *G06T 7/90* (2017.01); *G06V 10/454* (2022.01); *G06V 10/774* (2022.01); *G06V 10/82* (2022.01); *G06V 20/52* (2022.01); *G06T 2207/20081* (2013.01); *G06T 2207/20084* (2013.01); *G06T 2207/20221* (2013.01); *G06V 20/68* (2022.01)

(56) References Cited

U.S. PATENT DOCUMENTS

| | | | | |
|---|---|---|---|---|
| 10,878,290 | B2 * | 12/2020 | Omer | ............... G06Q 10/06393 |
| 2008/0082426 | A1 * | 4/2008 | Gokturk | ............ G06Q 30/0623 |
| | | | | 707/E17.014 |
| 2014/0126773 | A1 | 5/2014 | Miyakoshi et al. | |
| 2016/0225053 | A1 * | 8/2016 | Romley | ............... G06V 10/454 |
| 2016/0328660 | A1 | 11/2016 | Huang | |
| 2017/0083796 | A1 * | 3/2017 | Kim | ....................... G06V 10/82 |
| 2018/0239989 | A1 * | 8/2018 | Pan | ....................... G06K 9/6282 |

OTHER PUBLICATIONS

International Search Report and Written Opinion issued by the International Searching Authority for corresponding International Patent Application No. PCT/AU2018/051369, dated Mar. 7, 2019.

Bolle, R.M. et al., "VeggieVision: A Produce Recognition System", Proceedings Third IEEE Workshop on Applications of Computer Vision, 1996, pp. 1-8, ISBN: 0-8186-7620-5.

Faria, F.A. et al., "Automatic Classifier Fusion for Produce Recognition", 25th SIBGRAPHI Conference on Graphics, Patterns and Images, 2012, pp. 1-8, DOI: 10.1109/SIBGRAPI.2012.42.

Naik, S. et al. "Machine Vision based Fruit Classification and Grading—A Review", International Journal of Computer Applications(0975-8887), Jul. 2017, pp. 22-34, vol. 170, No. 9.

Sa, I. et al. "DeepFruits: A Fruit Detection System Using Deep Neural Networks", Sensors, Aug. 3, 2016, pp. 1-23, vol. 16, No. 8, MDPI, Basil, Switzerland.

Shotton, J. et al., "Semantic Texton Forests for Image Categorization and Segmentation", Proceedings Computer Society Conference on Computer Vision and Pattern Recognition, Jun. 2008, pp. 1-11, IEEE.

* cited by examiner

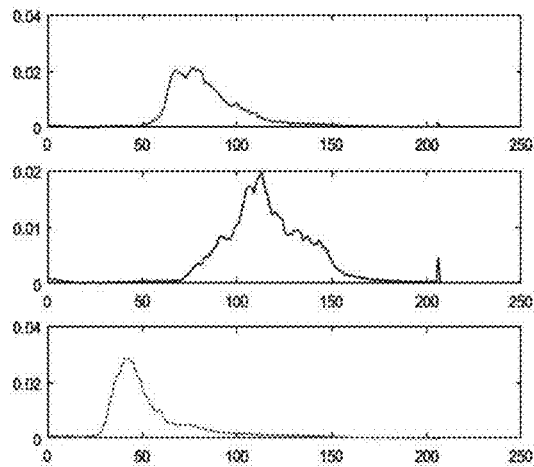
Figure 2A – Granny Smith
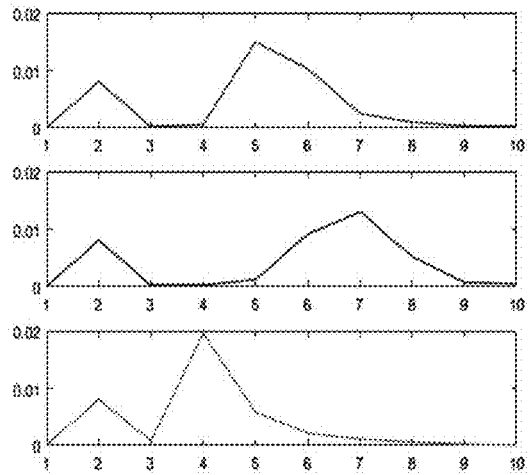
Figure 2B – Granny Smith (Banded)
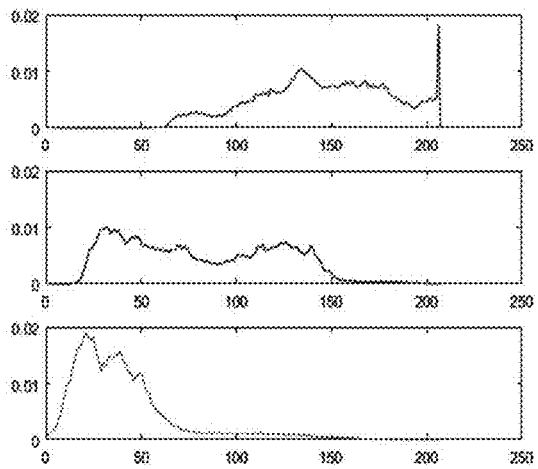
Figure 3A - Pink Lady
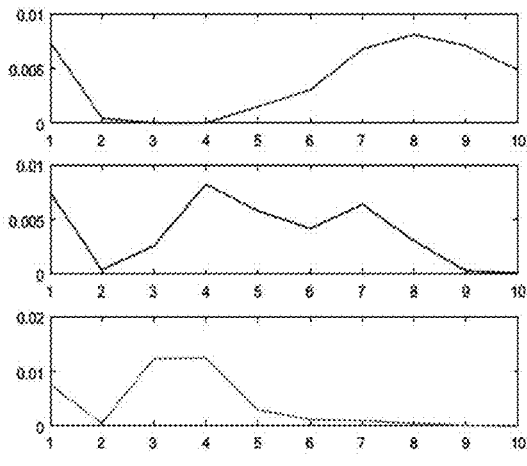
Figure 3B - Pink Lady (Banded)
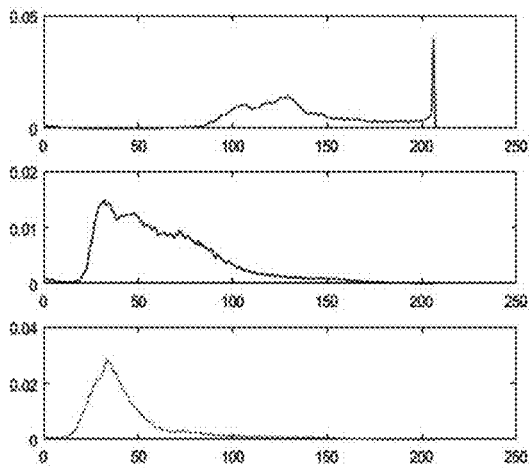
Figure 4A – Red delicious
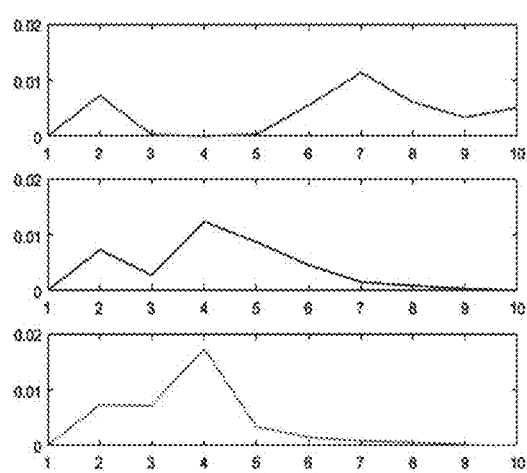
Figure 4B – Red delicious (Banded)

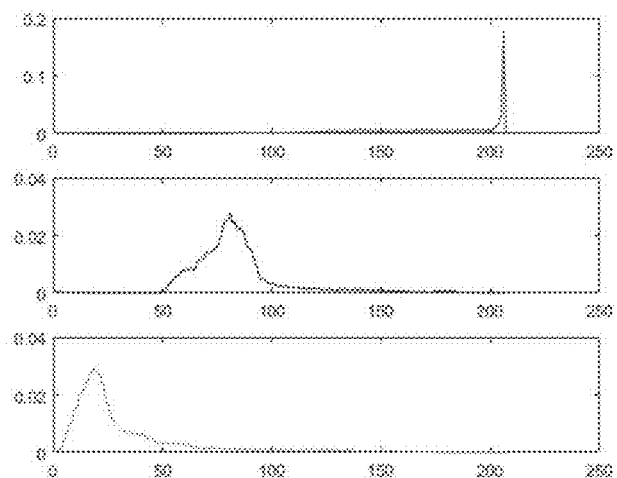
Figure 5 – Red delicious
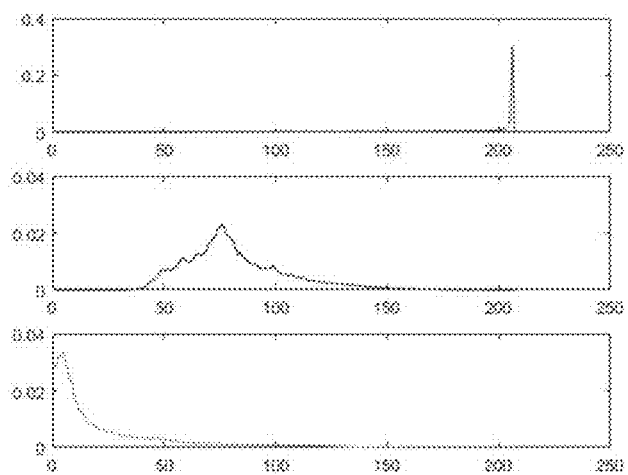
Figure 6 – Red delicious

112

| Type | Harlick texture features | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| GS | 0.31 | 0.2 | 0.95 | 22.2 | 0.97 | 8.97 | 89 | 1.53 | 2.3 | 0.2 | 0.23 | -0.8 | 0.98 | 0.2 |
| M | 0.24 | 0.43 | 0.95 | 21.1 | 0.94 | 8.26 | 84.4 | 1.68 | 2.59 | 0.4 | 0.39 | -0.8 | 0.98 | 0.25 |
| O | 0.26 | 0.21 | 0.97 | 21.9 | 0.98 | 8.63 | 87.7 | 1.55 | 2.31 | 0.21 | 0.2 | -0.9 | 0.98 | 0.22 |
| PL | 0.22 | 0.26 | 0.96 | 20.9 | 0.97 | 8.42 | 83.8 | 1.7 | 2.57 | 0.25 | 0.27 | -0.8 | 0.99 | 0.24 |
| RD | 0.26 | 0.25 | 0.93 | 18.6 | 0.96 | 8.25 | 74.5 | 1.61 | 2.45 | 0.24 | 0.28 | -0.8 | 0.98 | 0.27 |

Figure 7

RETAIL CHECKOUT TERMINAL FRESH PRODUCE IDENTIFICATION SYSTEM

CROSS REFERENCE TO RELATED APPLICATIONS

This application is a continuation of International Application PCT/AU2018/051369, filed Dec. 20, 2018, which claims priority to Australian Provisional Patent Application No. AU2017905146, filed Dec. 21, 2017, the contents of each of which are incorporated by reference herein.

TECHNICAL FIELD

This invention relates to a retail checkout terminal fresh produce identification system which, more specifically, employs machine learning using a fresh produce learning set to visually classify a fresh produce type in use when presented with image data captured at the terminal. Furthermore, the present machine learning system is trained in a particular way to address the limitations inherent in fresh produce retail environments. Whereas the present system and methodology has wide application for differing types of retail checkout terminals, such will be described hereunder primarily with reference to self-service checkout terminals. However, it should be appreciated that the invention is not necessarily be limited to this particular application within the purposive scope of the embodiments provided.

BACKGROUND

Self-service checkouts are increasingly commonplace today wherein shoppers are able to scan items and make payment substantially autonomously.

Whereas barcodes may be scanned on packaged goods, for fresh produce, such as fresh fruit, vegetables and the like, users are required to make a selection from an on-screen display.

However, such an approach is inaccurate with fresh produce items often being misclassified, inadvertently or dishonestly.

The present invention seeks to provide a way, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

There is provided herein retail checkout terminal fresh produce identification system for visual identification of fresh produce wherein the system is trained using machine learning. The system may integrate with conventional checkout POS system so as to be able to output the one or more predicted fresh produce types to the checkout system for on-screen display for selection by a shopper.

The imaging component of the system may comprise a mechanical jig comprising lighting (typically LED lighting), optionally a suitable homogenous background and a visible spectrum camera.

The camera captures an image of the fresh produce presented so as to classify the type of produce.

In embodiments, the system employs supervised machine learning by way of a neural network optimisation.

As will be described in further detail below, the present system is trained on a particular manner so as to address certain limitations inherent in fresh produce identification systems while maintaining desirous or suitable detection accuracies.

Specifically, detection accuracy may be increased utilising large datasets so as to account for uncontrolled environments across a large number of retailers. However, problematically, such large datasets may not be available, especially for retailers stocking relatively few fresh produce items.

Moreover, where large datasets are available it has not been possible in alternative solutions to generalise performance to scenes where data has not been collected. The method described solves this problem by describing how to collect and expand data such that a model can be generated that will generalise to the wide variety of environments seen in the application of POS.

Furthermore, the present system is ideally suited to minimise computational requirements in terms of processing and storage so as to allow the system to be built at low cost. The system may additionally address image resolution limitations (such as down to 740×480 pixels).

Additionally, luminosity and lighting colour fluctuations at checkout terminals may affect imaging of presented fresh produce items.

Specifically, in one or a preferred embodiment, the present system captures and utilises two feature vectors extracted from fresh produce image data comprising a colour histogram feature vector and Haralick texture features which are combined to form a full feature vector. The combination of these two feature vectors and the manner of their use was found during experimentation to provide sufficient accuracy and other advantages given the inherent limitations in retail produce identification systems.

In embodiments, the histogram is banded into various bands of increased width to reduce the colour histogram feature vector length so as to allow high-performance models to be trained with smaller learning datasets. Such is an important consideration for small to medium fresh produce vendor's where it is not practical to collect large numbers of training images. In this way, the performance can be improved on a small fixed size dataset by reducing the features available to the training model. In embodiments, the number of the bands may be optimised to optimise the accuracy of the neural network.

Furthermore, in embodiments, 14 Haralick Texture features are used comprising: Angular Second Moment, Contrast, Correlation, Sum of Squares: Variance, Inverse Difference Moment, Sum Average, Sum Variance, Sum Entropy, Entropy, Difference Variance, Difference Entropy, Info. Measure of Correlation 1, Info. Measure of Correlation 2, Max. Correlation Coefficient.

Again, a sub selection of these texture features may be selected when optimising the accuracy of the neural network again to address sample set and computational limitations.

The neural network is trained using a fresh produce learning set which, as alluded to above, may be limited in number for particular grocers. For example, the sample set training data may be only those fresh produce items commonly stocked by a particular retail outlet.

A full feature vector is calculated for each image which is then used to optimise the neural network, including the neural weightings and structure.

Once trained, the system is deployed to capture images of unknown input fresh produce items belonging to a category of the learning data set presented at the checkout terminal. The deployed system similarly generates a full feature vector from the collect image and generates a prediction using the trained neural model. The prediction is then transferred to the checkout system for processing using the defined communication protocol.

As such, in accordance with this arrangement, the consumer need not make selections from fresh produce items on-screen but may simply place the fresh produce item in front of the camera for identification. In embodiments, where the fresh produce item cannot be determined to a degree of accuracy, the deployed system may transmit a plurality of potential classifications to the checkout system which may then present a sub selection of fresh produce items on-screen for selection by the consumer.

It should be noted that no specific information about the digital signature/colour histograms of each fresh produce category is contained in the optimised neural network model once deployed onto the deployment system. As such, the deployment system does not require large memory or significant computational power to identify the fresh produce category conferring advantages in reducing computation and storage and therefore cost.

EP 0685814 A2 (D1) discloses a produce recognition system. According to D1, a processed image is compared to reference images wherein an object is recognised when a match occurs. However, in contradistinction, the present system is able to avoid deployment of reference images to deployed systems, requiring only the provision of the trained neural network model, thereby reducing the computational storage of the deployed systems.

Furthermore, while D1 does mention image features including colour and texture, D1 does not utilise a full feature vector comprising a combination of only a colour feature vector and a texture feature vector as does the present system.

Furthermore, D1 does not seek to reduce computational requirements and therefore does not seek to band the colour histogram as does the present system, let alone optimising the number and widths of bands for optimising accuracy to address learning set limitations. Furthermore, D1 does not disclose sub selection of texture features for further addressing such limitations.

As such, with the foregoing in mind, a plurality of embodiments is disclosed herein. Disclosed is a method of and system for image categorisation including in pre-processing, starting with a first number of images, generating a second number of images by digital operations on the first number of images, extracting features from the second number of images, and generating a classification model by training a neural network on the second number of images wherein the classification model provides a percentage likelihood of an image's categorisation, embedding the classification model in a processor receiving an image for categorisation, wherein the processor is in communication with a POS system, the processor running the classification model to provide output to the POS system of a percentage likelihood of the image's categorisation.

In accordance with one embodiment there is provided a retail checkout terminal fresh produce identification methods and systems comprising: at least one visible spectrum camera; a processor in operable communication with the visible spectrum camera, and a memory device for storing digital data, the memory device in operable communication with the processor across a system bus; and a checkout system interface wherein, in use: the system is trainable wherein: the processor is configured for receiving fresh produce image data from a fresh produce learning set using a visible spectrum camera; the memory device comprises a feature vector generation controller configured to generate a full feature vector for each fresh produce image, the full feature vector comprising a combination of: a colour histogram feature vector; and a texture feature vector; dominant colour segment vector; pre-trained convolutional neural network; the memory device comprises a neural network optimisation controller for optimising a neural network model, the neural network optimisation controller configured for optimising the neural network model utilising the full feature vector; and the optimised neural network model is deployed to the system, and the system is deployable to predict fresh produce classifications wherein: the processor is configured for receiving image data via a visible spectrum camera; the feature vector generation controller is configured for calculating a full feature vector for the image data comprising a colour histogram feature vector and a texture feature vector and inputting the full feature vector into a neural network optimised with the neural network model to output a fresh produce classification prediction; and the system outputs the fresh produce classification prediction via the checkout system interface.

In another embodiment, disclosed is are methods of systems for image categorisation includes starting with a first number of images, generating a second number of images by performing digital operations on the first number of images, extracting features from the second number of images in according with:
  a. a pre-trained Convolution Neutral Network (CNN) trained on large data set used as a feature detector;
  b. Colour space histogram;
  c. Texture features by a numerical feature vector; and
  d. Dominant Colour Segmentation and training a neural and training a neural network on the features extracted to generate a classification model wherein the classification model provides a percentage likelihood of an image's categorisation.

Also disclosed is are methods and systems for categorising products, including populating with a first number of images, generating a second a second number of images by digital operations on the first number of images, feature extracting from the second number of images wherein the feature extracting comprises running a pre-trained Convolution Neural Network (CNN) as a feature extractor and then generating a classification model by processing the second number of images by a neural network wherein the classification model provides a percentage likelihood of an image's categorisation.

Furthermore disclosed is are methods of a systems external to a Point-of-Sale (POS) system wherein the external system comprises a processor and captures an image and runs a classification model embedded in the processor that provides as output scores for the percentage likelihood of the image's category and the external system generates a formatted communication as output comprising a protocol to the POS system, wherein the POS system receives the formatted communication of the output by a classification model of the external systems.

Moreover disclosed is a method and system for expanding an image data set, including in pre-processing, starting with a first number of images, segmenting the first number of images, generating a second number of images by digital operations on the first number of images, extracting features from the second number of images and processing the second number of images by a neural network, and thereby generating a classification model for deployment, wherein segmentation of an image is not performed at deployment.

Further features include that the colour histogram feature vector may be normalised to a scale.

The scale may be between 0 and 1.

The feature vector generation controller may be configured for banding colour histogram feature vector into discreet bands.

The neural network optimisation controller may be configured for optimising the number discreet bands.

The discreet bands may comprise between 5-100 bands.

The discreet bands may comprise 10 bands.

The texture feature vector may comprises a plurality of texture features.

The texture features may comprise at least a subset of Angular Second Moment, Contrast, Correlation, Sum of Squares: Variance, Inverse Difference Moment, Sum Average, Sum Variance, Sum Entropy, Entropy, Difference Variance, Difference Entropy, Info. Measure of Correlation 1, Info. Measure of Correlation 2, Max. Correlation Coefficient.

The neural network optimisation controller may be configured for selecting a subset of the plurality of texture features for optimising the accuracy of the neural network.

The subset of the plurality of texture features may comprises between 8 and 12 texture features.

The texture features may comprise 10 feature vectors.

The neural network optimisation controller may be configured for optimising the number of neurons of the hidden layer.

The number of neurons may be between 100 and 120.

The number of neurons may be 116.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIGS. 2A-6 show exemplary colour histogram vectors and associated banded colour histogram from different types of fruit;

FIG. 7 show exemplary Haralick feature vectors for the same fruits of FIGS. 2-6;

DETAILED DESCRIPTION OF EMBODIMENTS

Figure 1:
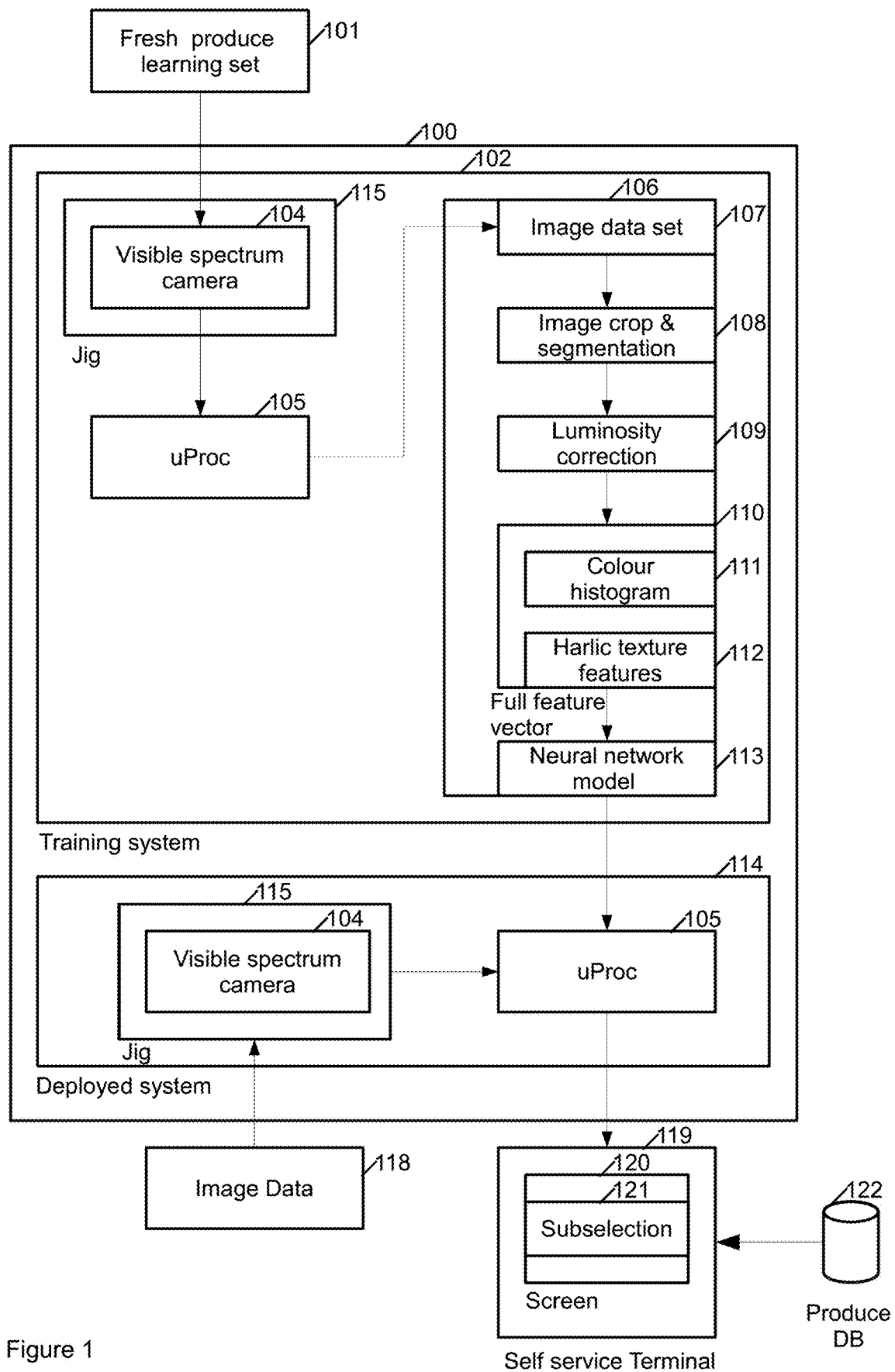
FIG. 1 shows a retail checkout terminal fresh produce identification system 100 in accordance with an embodiment.

FIG. 1 shows a retail checkout terminal fresh produce identification system 100 which is trained to predict fresh produce classifications for self-service terminals.

The system 102 comprises a processor 105 for processing digital data. In operable communication with the processor 105 across a system bus is a memory device 106. The memory device 106 is configured for storing digital data, including computer program code instructions and associated data. As such, in use, the processor 105 fetches these computer program code instructions and associated data from the memory 106 for interpretation and execution thereon.

In embodiments shown in FIG. 1, the computer program code instructions of the memory device 106 have been shown as being logically divided into various computer program code controllers which will be described in further detail below.

In use, the system 102 is trained utilising a fresh produce learning set 101.

In this regard, the system 102 may operate as a training system 106 and a deployed system 114 for respective operations which may comprise shared or separate componentry. As alluded to above, the deployed system 104 may take the form of a low-cost computing device having low processing and storage requirements.

The system 102 may comprise mechanical jig 115 for capturing image data. In this regard, the jig 115 may comprise a visible spectrum camera 104 and associated lighting and an appropriate a homogenous surface background (not shown) for optimising the image capture process. As such, during training, during use, an item of fresh produce would be placed in front of the visible spectrum camera 104 for the capturing of image data therefrom or alternatively loaded from an image database.

During the training process, the processor 106 stores an image data set 107 captured by the camera 104 from the learning fresh produce set 101 in memory 106. In embodiments, for a particular grocer, the grocer may provide a sample set of each produce type to the system for learning.

The memory 105 may comprise an image cropping and segmentation controller 108 for cropping and segmenting the portion of the image comprising the fresh produce from the homogenous background. In embodiments, the image segmentation may employ Otsu's algorithm.

The image cropping and segmentation controller 108 isolates the fresh produce item image from the homogenous background for use for generating the full feature vector that contains only the fresh produce item on a preferably black background. This process minimizes any background interference and reduces the training required for the neural network model allowing smaller learning data sets 101 to be used to achieve good prediction performance.

Thereafter, a luminosity correction controller 109 may adjust the luminosity of the image data.

The luminosity may be corrected as part of the data collection and prediction process by normalising the average grayscale luminance of the RGB data image. The RGB images may be converted to grayscale equivalents using a standard colour to grayscale conversion. An average grayscale image luminance set point is chosen, typically half the dynamic range, to normalise all RGB images to have an approximately equal average grayscale luminance.

The luminosity correction may comprise the following computational steps:

Let $I_{xyz}$ represent an image of x×y pixels, where $z=\{r, g, b\}$ represents each colour component of the RGB image.

Let $I_g$ represent the x×y pixels grayscale representation of $I_{xyz}$. $I_g\hat{\ }$ represents the average luminance of $I_g$ Let $I_{sp}$ the average grayscale luminance set point.

Where ILC is the luminosity corrected image:

$$ILC = Ig\hat{} - Isp$$

The memory device 106 may further comprise a feature vector generation controller configured for generating a full feature vector 110 comprising a combination of a colour histogram feature vector 111 and a Haralick texture feature vector 112.

Colour Histogram

The colour histogram of each fresh produce item is used as a feature of the digital signature vector of the fresh produce item. A set of the colour histograms along with texture features is used to train the neural network model 113.

FIGS. 2A-6 show exemplary RGB colour histograms for differing types of apples.

The colour histogram may be created by taking an RGB image and creating a histogram using all possible colour intensity values as the x-axis bins and collecting the frequency of occurrence for each intensity.

The colour histogram may be normalised by scaling the maximum frequency of the banded colour histogram to 1. All other histogram values are linearly reduced by the same scaling factor such that all the colour histogram values are between 0 and 1.

In a preferred embodiment, the histogram bin width is increased in a 'banding' process. This process reduces the colour histogram feature vector length allowing high performance models to be trained using smaller learning data sets.

This is an important feature for small to medium fresh produce vendors where it is not practical to collect large numbers of images. The performance can be improved on a small fixed size data set by reducing the features available to the training model. The banding process is carried out by reducing the number of bins in the colour histogram. The bins in the full colour histogram may be allocated sequentially and distributed evenly to each larger bin. The larger bin frequencies may be calculated by averaging the frequency in the smaller bins allocated to it. The result is the banded colour histogram as shown in FIGS. 2B, 3B, and 4B.

In embodiments, the number/widths of bins may be optimised when optimising the neural network.

The calculation of the colour histogram and banded colour histogram may comprise:

Full Histogram:

Let Ixyz represent an image of x×y pixels, where z={r, g, b} represents each colour component of the RGB image.

Iverson brackets are defined here as:

$$|P| = \begin{cases} 1, & \text{if } P \text{ is true} \\ 0, & \text{otherwise} \end{cases}$$

Where n is the colour depth, histogram bins are calculated as:

$$zk = \Sigma_i^{x}=0 \ \Sigma_j^{y}=0 [Ixyz=k], k \in \{0, n-1\}$$

The three components of the of the histogram vector are then:

$$FR = (r_0, r_1, \ldots, r_n-1)$$

$$FG = (g_0, g_1, \ldots, g_n-1)$$

$$FB = (b_0, b_1, \ldots, b_n-1)$$

Let the maximum normalised colour histogram vector be:

$$\overline{Z} = \frac{z}{\max(z)}$$

The full histogram vector is then constructed as:

$$FH = (\overline{FR}, \overline{FG}, \overline{FB})$$

Banded Histogram:
Where b is the number of bands: the band width is calculated as: n=
The banded histogram bins are calculated as:

$$zg = \frac{1}{m} \sum_{i=0}^{m(g+1)} FH_i, g \in \{0, b-1\}$$

Note: b−1 will be an average of (m−1) components if n is not an integer multiple of b.

The three components of the of the banded histogram vector are then:

$$BR = (r_0, r_1, \ldots, r_n-1)$$

$$BG = (g_0, g_1, \ldots, g_n-1)$$

$$BB = (b_0, b_1, \ldots, b_n-1)$$

The banded histogram vector is then constructed as:

$$BH = (\overline{BR}, \overline{BG}, \overline{BR})$$

In embodiments, 14 texture features (e.g. Haralick Texture features) are used comprising: Angular Second Moment, Contrast, Correlation, Sum of Squares: Variance, Inverse Difference Moment, Sum Average, Sum Variance, Sum Entropy, Entropy, Difference Variance, Difference Entropy, Info. Measure of Correlation 1, Info. Measure of Correlation 2, Max. Correlation Coefficient. The mathematical calculation of these features is common state of the art.

These 14 texture features are combined into a vector and used as a set of features for training the neural network predictor. Specifically, FIG. 7 shows texture feature vector is collected for each of the apple varieties mentioned above.

The full feature vector 110 is then utilised to optimise the neural network model 113.

The prediction output by the system 100 may be sent via an interface to a self-service terminal 119 for on-screen display of the predicted item on a screen 120. Such a prediction may be cross referenced with a produce database 122 for the purposes of checkout. As alluded to above, where an item cannot be predicted to a certain degree of accuracy, a sub selection interface 121 may be presented on screen 120 comprising the likely candidates from the set of produce items for selection by the user.

Neural Network Optimisation—Exemplary Test Results

During optimisation, the following parameters may be varied: number of neural network layers, number of neural network nodes in each layer, number of colour histogram bands, number of texture features.

The system may automate the optimisation of these parameters to optimise the detection accuracy of the neural network model 113.

For example, for the exemplary test results provided below, for the colour histogram and texture feature vector is provided in FIGS. 2-7, 2866 images where used over 6 categories comprising:

1. Apple—Granny Smith
2. Apple—Pink Lady
3. Apple—Red Delicious
4. Apple—Royal Gala
5. Mandarin—Imperial
6. Orange—Navel During training as will be described in further detail below the system optimised the neural network model 113 to comprise a single hidden layer having 137 hidden layer neurons and utilising all texture features and 10 bands for the banded colour histogram.

Figure 8:
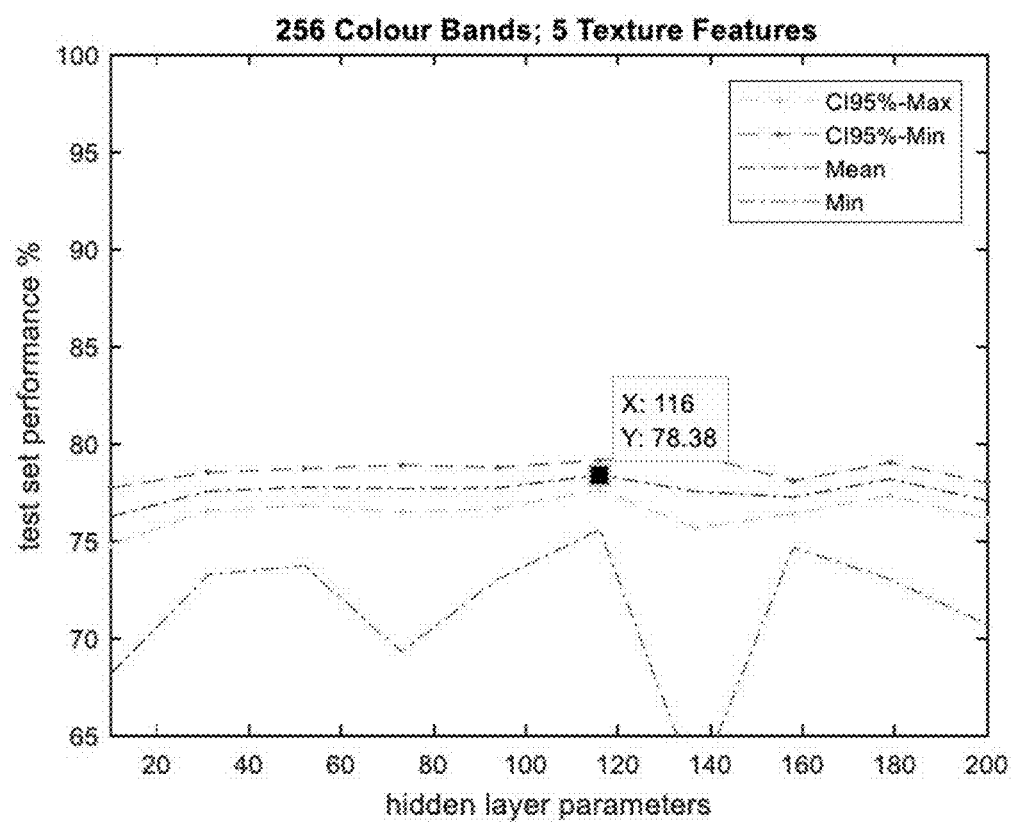
FIG. 8 shows test results from it and layer optimisation.
Figure 9:
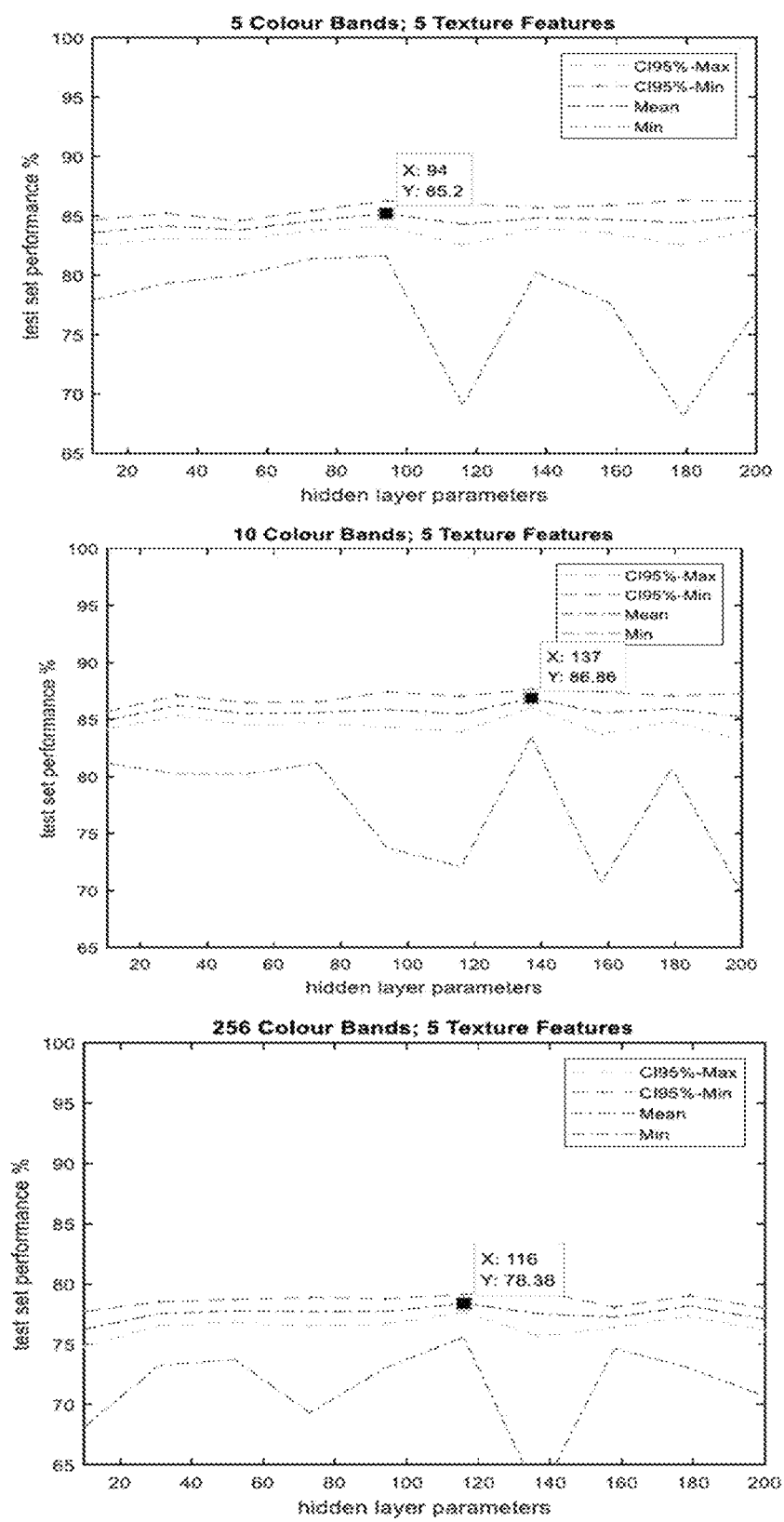
FIG. 9 shows test results from colour band optimisation.
Figure 10:
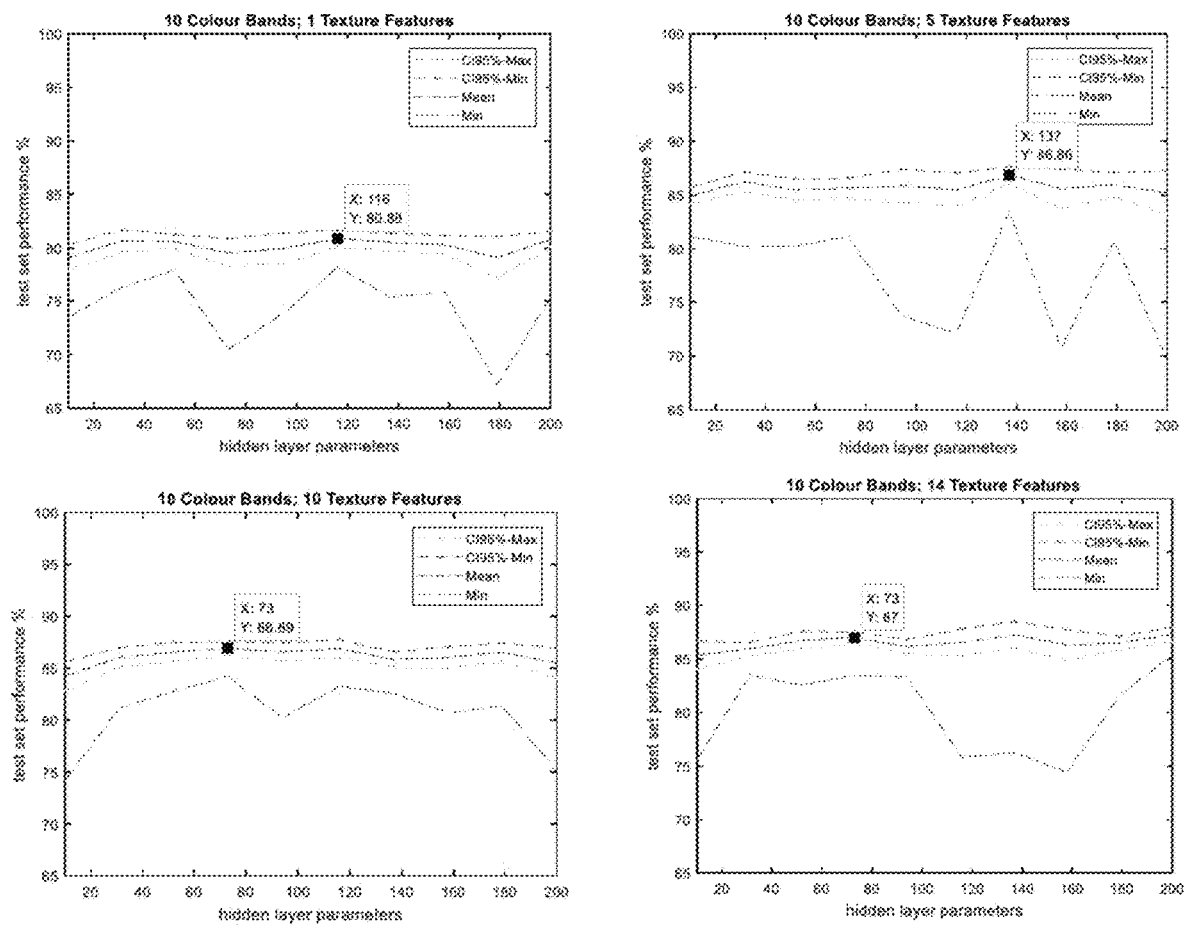
FIG. 10 shows test results from texture feature optimisation.

FIGS. 8-10 provide various performance plots to illustrate the optimisation process For each of the various model configurations, 22 models were developed using random selections of training, validation and test sets. The performance was then checked using a test set where the following are calculated and plotted using the 22 runs:
 a. Mean
 b. 95% confidence internal for the mean
 c. Minimum.

Selection of the best neural network model configuration is based on these parameters wherein the best performing model has the largest mean, smallest confidence interval and a minimum close to the lower confidence interval. Model performance is compared based on these parameters. Selecting a model based on this approach provides a solution to finding optimal performance on a small dataset. The typical solution to increasing model performance is to increase the dataset size, however, as alluded to above, in particular for fresh produce markets, only a limited fresh produce learning set 101 may be available. As such, for the present application, it is not possible to adopting the conventional approach of increasing the size of the learning set for optimising accuracy.

Hidden Layer Optimisation

FIG. 8 illustrates hidden layer optimisation wherein, as can be seen, although the mean performance is quite consistent peaking at ~78% where 116 hidden neurons are used, using approximately 140 hidden neurons results in widely varying model performance.

Colour Band Optimisation

FIG. 9 additionally shows why colour band optimisation is important for achieving optimal performance on the small fresh produce learning set 101. Specifically, when the full 256 colour bands are used, performance peaks at 116 hidden layer neurons with a mean of ~78%. With 10 colour bands the performance peaks at ~87%.

Texture Feature Optimisation

FIG. 10 illustrates optimising the number of texture features.

Although the models with 5, 10 and 14 texture features have mean performance of ~87%, models with 10 texture features yield more consistent performance and therefore would be the best choice for this particular application.

Figure 11:
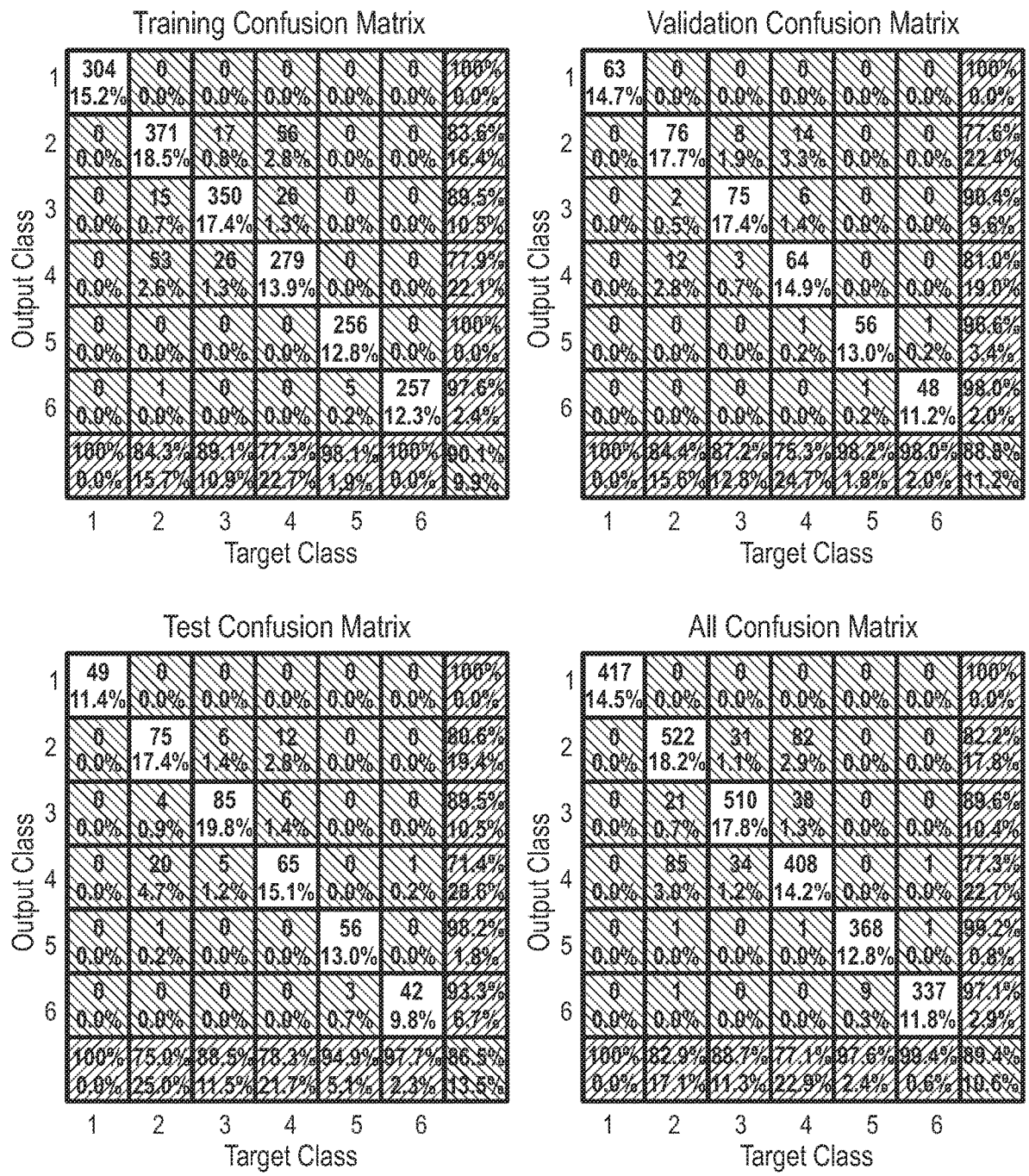
FIG. 11 shows test result detection accuracies.

FIG. 11 illustrates the final performance of the system 100 according to this exemplary test.

As discussed above, disclosed are a plurality of embodiments of methods and systems for image categorisation. Above, discussed in detail is one embodiment which utilises two feature vectors extracted from fresh produce image data comprising a colour histogram feature vector and Haralick texture features which are combined to form a full feature vector. That is, above, methods and systems utilising two feature extraction processes of a feature vector generation controller are disclosed. Alternatively, a feature vector generation controller is disclosed which processes an image data set according to the following feature extraction processes:
 a. a pre-trained Convolution Neural Network (CNN) trained on large unrelated and/or separate data sets used as a feature detector;
 b. Colour space histogram;
 c. Texture features by a numerical feature vector; and
 d. Dominant colour segmentation A feature vector generation controller to affect the execution of the categorization model may therefore be embedded in a processor utilized at deployment.

As previously discussed, the deployment system 102 including a camera to capture an image at the place of deployment may take the form of a low-cost computing device having low processing and storage requirements. The deployment system 102 can be installed external to a POS system or may integrated into a POS system. Either way, external or integrated, in order for the presently described systems and methods to be relevant in a commercial setting, the providing a percentage likelihood of an image's categorization quickly, reliably and inexpensively is preferred. Current POS systems can cooperate with the presently described systems and methods externally. Thus, the presently described systems and methods are designed to communicate with a POS system a percentage likelihood of an image's categorization with a disclosed protocol.

As discussed above, in order to train the neural network on input images, a learning set is provided. In FIG. 1, digital operations including image crop and segmentation 108 and luminosity correction 109 are performed on a learning set. Further detail of a training system provided in FIG. 12, wherein the image data set is a "2nd number of images" generated as a result of digital operations on a "1st number of images."

Figure 12:
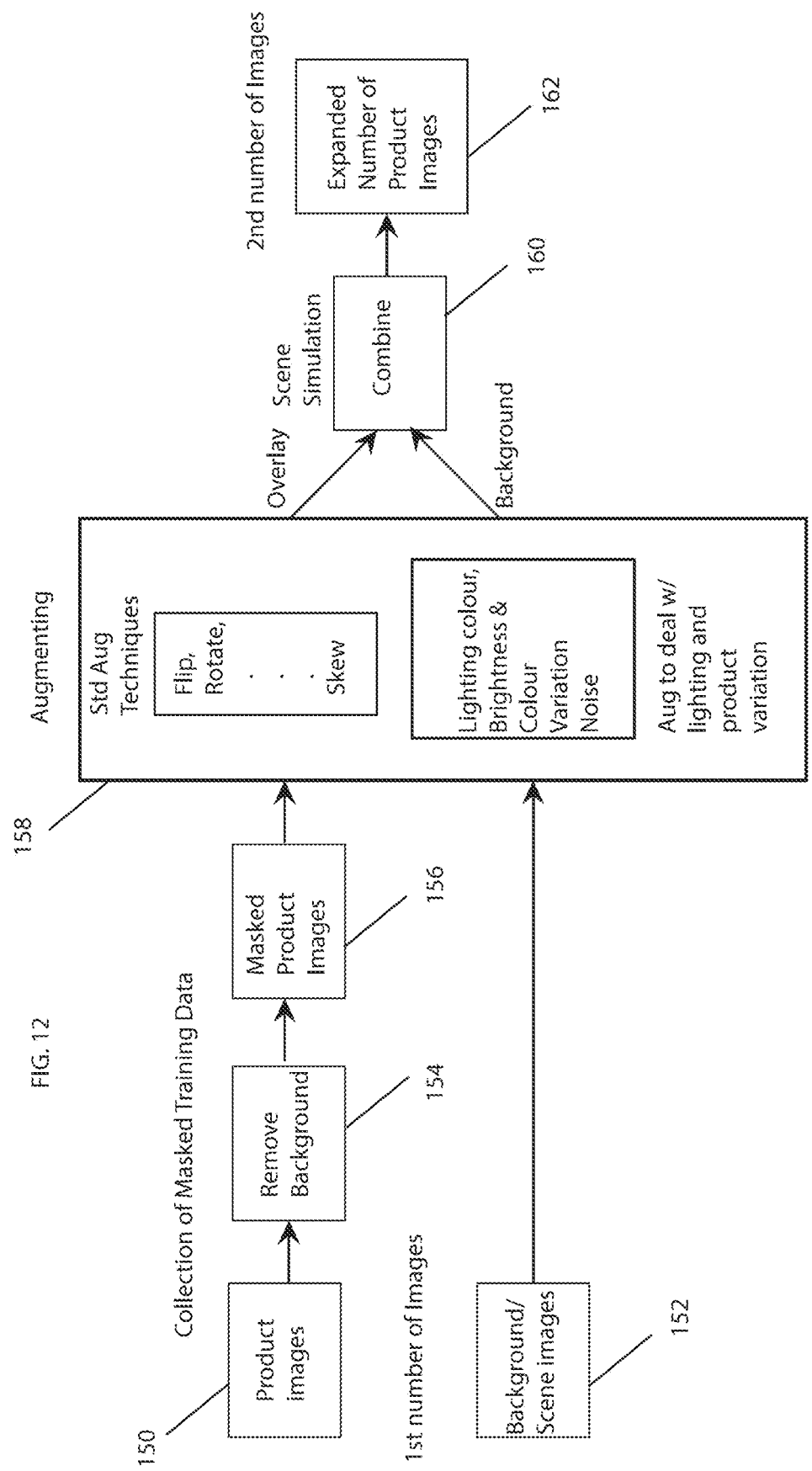
FIG. 12 depicts the pre-processing of a $1^{st}$ number of images to generate a $2^{nd}$ number of images.

FIG. 12 depicts the pre-processing of a 1st number of images to generate a 2nd number of images. A 1st number of images may be, for example, 100 images of one type of fruit maybe provided at steps 150 and 152. The 1st number of images may further be processed including the product images having the background removed 154 to generate mask product images 156. The images 152 and 156 are then subjected to augmenting techniques 158 including flip, rotate, sheer, zoom and skew as well as augmenting to deal with lighting and product variation, including lighting colour and brightness shifting and colour variation noise. This augmenting process may expand the original image set by >10×. This expanded product image set may be combined with a background set, including empty scenes where the classification model is to be deployed, by and overlaying images are randomly or non-randomly for scene simulation 160 to generate a 2nd expanded number of product images 162. The background set may contain >10 scenes and may include various lighting conditions, to provide robustness in addition to the augmentation. To maximise performance across the expected deployment environments, the background set may be augmented as described including lighting and colour variation. The background set may be an exhaustive representation of all environments expected in deployment. From the initial 1st number of images, for example, 100 images, with product image expansion and scene simulation >10000 number of images with sufficient quantitative variation (which may be segmented images or non-segmented images) to train the neural network may be generated, such that the neural network is robust to variation in lighting, background and natural product variation.

Other types of images can be also processed as described above to simulate conditions without the expensive process of data collection. For example, bag simulation on items using images of bag texture blended with masked produce images may be utilized, to provide robust classification performance where products are placed in semi-translucent packaging. Furthermore, hand simulation for example with product by using hand images combined with masks may be utilized. For products that are not produce, such as loose bulk products, the same processes can be utilised. A benefit is that items without bar codes can be processed quickly at the site of deployment as if they had a bar code.

Figure 13:
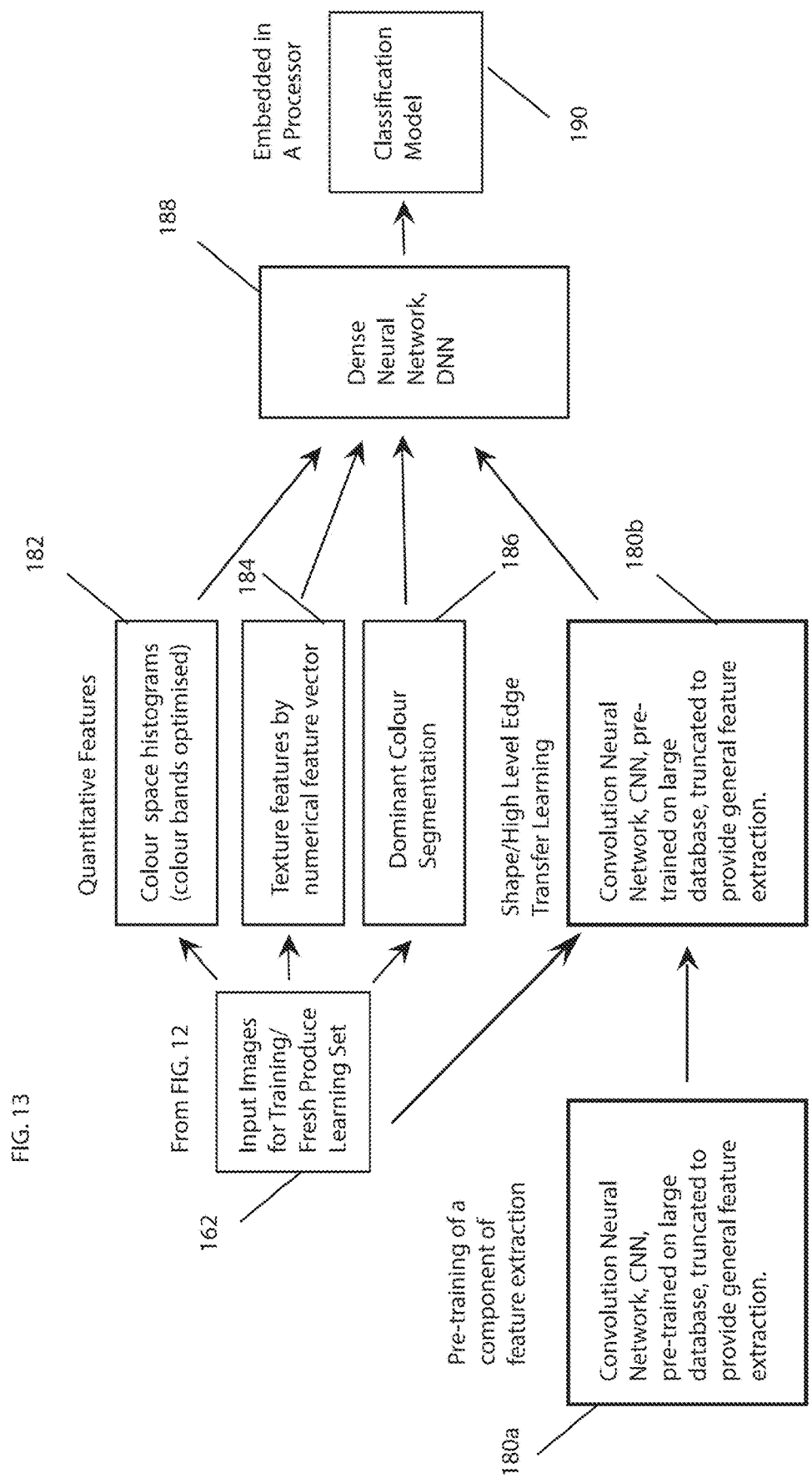
FIG. 13 depicts the feature extraction of the $2^{nd}$ number of images and the learning process to generate a categorisation model based upon the $2^{nd}$ number of images.

Now turning to FIG. 13, FIG. 13 depicts the feature extraction of the 2nd number of images and the learning process to generate a categorisation model based upon the 2nd number of images. The feature extraction process may include utilising a pre-train convolution neural network 180a, CNN, use a high-level feature extraction. The CNN may be pre-trained on a large dataset, for example, millions of images, and then truncated to deliver general feature extraction/detection. It is beneficial to choose a high performing low computational architecture e.g. the MobileNet architecture. This approach delivers much higher performance since the pre-trained CNN is able to identify high level features in various scenes. In combination with more general features such as colour and texture an exceptional level of performance and generalisation can be achieved. Note this approach is contrast to state-of-art for product identification where typically, a CNN architecture would be trained on the available dataset explicitly. While these architectures have proven to perform well in a wide variety of applications, without significant number of images per category >>1000 training these models proves to be difficult and models do not generalise.

The generated 2nd expanded number of product images 162 are received so that quantitative features can be extracted. As discussed above, the feature extraction can include, a pre-trained Convolution Neural Network (CNN) trained on large data set separate to the 1st set of images used as a feature detector 180b, colour space histogram 182 such as R, G, B colour histograms (wherein colour bands may be optimized), texture features by a numerical feature vector 184 such as texture features using Haralick texture feature and Dominant colour segmentation 186 such as dominant colour segments using K-Means Colour segmentation and the pretrained CNN 180b which as discussed is a pre-trained Convolution Neural Network (CNN) trained on large data set.

A fully-connected feed-forward neural network 188 trains on the features extracted from the input images 162. The feed-forward neural network may generate a score for each category to output a classification model 190 which can run on a feature vector generation controller to make predictions of images received at a deployment location. The classification model 190 may be embedded as a feature vector generation controller and incorporated into an inexpensive processor 105 of FIG. 1. In keeping with the commercial aspects of the presently disclosed systems and processes, the benefit of running the categorization model arrived at through the described processes, is that running the same categorization model requires little processing power for quick output at the deployment location and does not require storage of images or data signatures.

Figure 14:
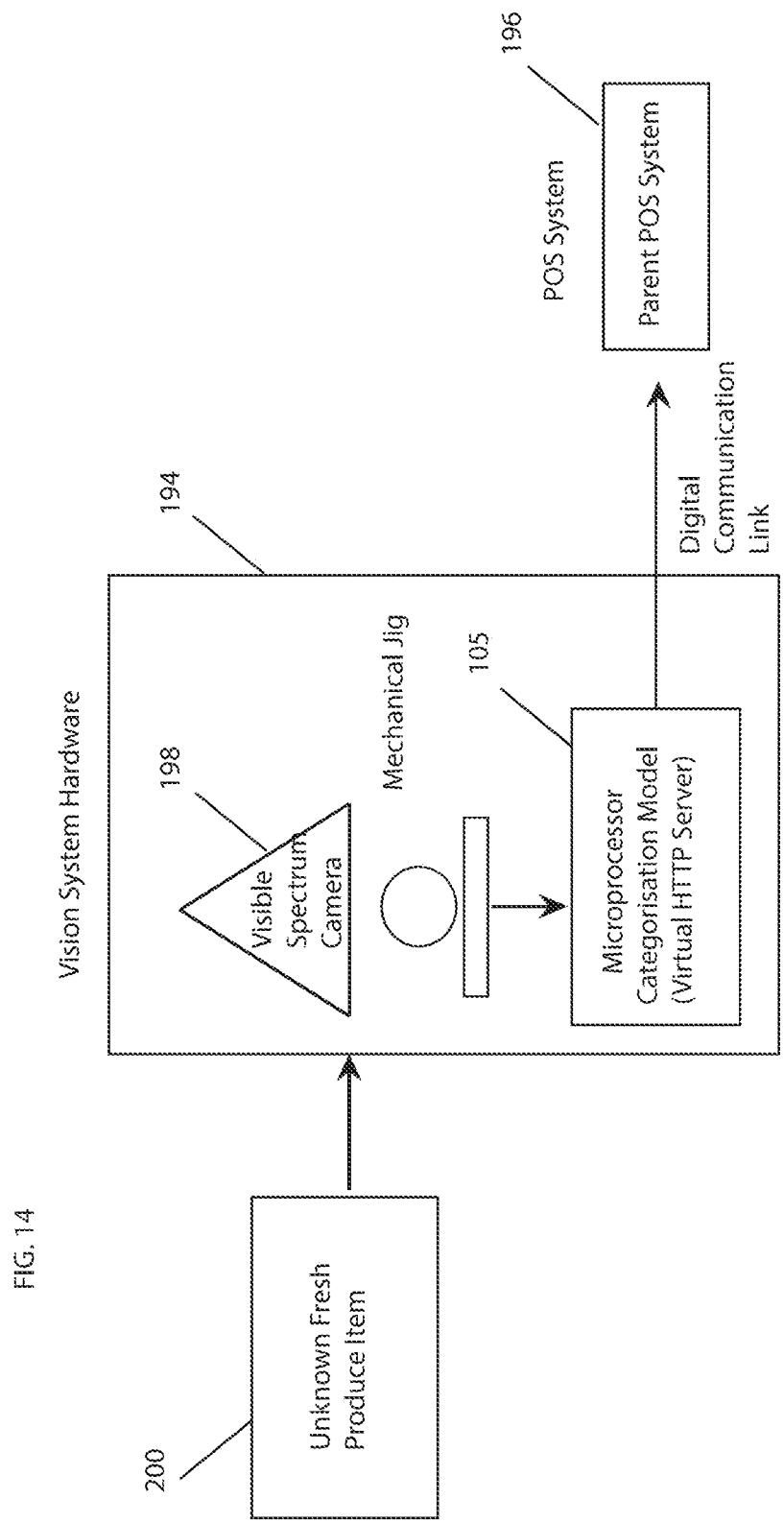
FIG. 14 depicts the deployed categorisation model in use with a POS system.

Turning to FIG. 14, FIG. 14 depicts the deployed categorisation model in use with a POS system, that is, the disclosed methods and systems can include a system 194 external to a Point-of-Sale (POS) system 196 at the deployment location wherein the external system comprises a processor 105 and captures an image with a visible spectrum camera 198 for example, of an unknown fresh product item 200, and runs a classification model embedded in the processor 105 that provides as output scores for the percentage likelihood of the image's category. The image feature extraction at the POS system deployment utilizes the same parameters and configuration as that used in training. Alternatively, the deployed features extraction may include variations such as non-segmentation discussed below. Training data is stored in the Cloud and not locally. Only a small trained categorization model is embedded in the processor 105 so that the feature vector generation controller is deployed which is a fraction of the size of the data. Training data for 100 categories for example may be >40 GB where the deployed model and code base in <150 MB.

The external system 194 may generate a formatted communication as output comprising a protocol to the POS system, wherein the POS system 196 receives the formatted communication of the output by a classification model of the external systems. Depending upon the pre-processing, and starting with a first number of images, segmentation of the first number of images may be processed wherein segmentation of an image received from the visible spectrum camera 198 is not performed at deployment. Alternatively, the visible spectrum camera 198 may be a 3-D camera so that segmentation is not performed at deployment, but rather achieved by depth thresholding. Various adjustments may be made to limit the amount of processing required at deployment so as to allow the processing to occur quickly. The present systems and methods are intended to operate quickly and for the hardware of the vision system 194 to be inexpensive.

Segmentation (extraction of only masked image produce in foreground without background), as noted may affect processing efficiency at the deployment location. As mentioned, prediction may be run on non-segmented or segmented images. For segmented images background simulation is not required. Segmentation robustness depends on the approach: Threshold background subtraction: Create a model (e.g. Guassian, KNN) of the background using >=1 images. Compare to produce image to create the mask. Using stereoscopic imaging to obtain depth information and create a mask based on a known background depth. For non-segmented, scene simulation may be used to teach a system to recognize produce in various environments.

In another embodiment, the deployed system may combine multiple viewing angles to increase statistical variance of features. Multiple cameras may be implemented by combining (stitching) images into a single image and running through the previously discussed prediction process. Mirrors may be used to enhance viewing angles and increase variance may be used in the same stitching process. No lights may be achieved with auto exposure adjustment or and HDR capable camera. The camera can be live calibrated using laser or external lighting in a scanner or dedicated calibration lighting/laser. The disclosed systems and methods may be implemented to only disable selection of non-barcoded items when a sufficient prediction score is not reached.

The algorithmic instructions for features extraction, including the pre-trained CNN, along with the trained neural network may be deployed on an external system with communication to the POS system such as a low-cost single board computer or deployed directly onto the POS machine where communication is facilitated virtually.

As shown in FIG. 13, the communication with the POS system may be implemented an HTTP server that sends JSON document to provide a percentage likelihood of an image's 200 categorization. It uses the an ethernet connection, but can be adapted for Wifi, Serial or other digital data transfer mechanism.

The disclosed systems and methods can provide for various prediction options. Object detection using threshold assessment of a masked image; trigger by external input (fresh produce button pressed, scale stability); run prediction constantly making result always available to external system when required; and/or use constant prediction to assess if produce is present and trigger external system when sufficient certainty is reached. Certain categories may not be required when they are not active in the POS system. A minimum top score may be achieved so that one or more results may be displayed with an optional cut-off score for ranked results is provided.

The disclosed system includes a convenient way to communicate with the POS via a defined protocol. Predictions made by the device may be stored JavaScript Object Notation (JSON) file allowing easy integration into most programming languages. The JSON file may be served periodically or when requested by the POS via a HTTP server or serial link. Other standard data structures e.g. XML, may be used which allow formatting of the following information.

TABLE 1

| Parameter | Description |
|---|---|
| Type (type) | Response type: Product; No fresh produce; No response; Low score; Hand. |
| Full product name (full_name) | Full product name e.g. 'Apple-Granny Smith', 'Tomato-Truss-Cherry'. |
| Category (category) | The top-level category of fresh produce item. e.g. Apple-Granny Smith = "Apple" |
| Variety 1 (variety_1) | First level of variety. e.g. 'Tomato-Truss-Cherry' = "Truss" |
| Variety 2 (variety_2) | Second level of variety. e.g. 'Tomato-Truss-Cherry' = "Cherry" |
| Tiliter GUID (tiliter_id) | Tiliter database identifier. |
| Price Look-up Number (plu) | The unique product identification number/s associated with predicted fresh produce item. e.g. Apple-Pink Lady = "[4128, 4130]" The PLU numbers are sorted by the associated size from smallest to largest. e.g. Apple-Pink Lady (Small) = 4128; Apple-Pink Lady (Large) = 4130. The system does not differentiate between produce size, therefore all possible PLU numbers for the type are provided. |
| Score (score) | Prediction score 0-100 e.g. 80 = 80% |

Contains a single JSON list "predictions".
The list is sorted by "score" from largest to smallest.

TABLE 2

Message types

| Message type | Description | Message Contents |
|---|---|---|
| No response | No item has been detected. | Score = "-1" |
| Low Score | Score of the top result is < min_score | |
| Hand | Hand detected. i.e "Hand" category is the top result. | |
| No fresh produce | Item is detected, but it is not fresh produce. i.e. "Non-produce" category is the top result. | |
| Product | General produce category. | See Table 1 |

The disclosed systems and methods provide a scalable solution for identifying non-barcoded items such as fresh produce and buy-in-bulk items at a POS system using a camera. The disclosed systems and methods solutions allow adding new items. The disclosed systems and methods beneficially allows a general solution by learning high level feature relationships that can be taught to account for variation in lighting, background and seasonal variations. The disclosed systems and methods avoid expensive hardware and is therefore scalable due to low implementation costs. Also avoided are high internet bandwidth and server costs that could prohibit using cloud API service.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilise the invention and various embodiments with various modifications as are best suited to the particular use contemplated. It is intended that the following claims and their equivalents define the scope of the invention.

The invention claimed is:

1. A method of image categorisation, comprising:
in pre-processing:
receiving a plurality of images of backgrounds in which items are to be recognised as a background image set,
receiving a number of original images of items to be recognised in an original item image set,
masking the background of the original images in the original item image set to generate a masked item image set,
digitally augmenting the masked item image set to generate an augmented masked item image set that includes a larger number of images of masked items than the masked item image set,
superimposing each image of the augmented masked item image set on each of the images of the background image set to generate a plurality of new training images as part of a training image set, the training image set thereby providing quantitative variation to train a neural network,
extracting feature vectors from the training image set, wherein extracting the feature vectors includes calculating a colour space histogram;
generating a classification model by training the neural network on the training image set and the extracted feature vectors, wherein the classification model provides a prediction of an image's categorisation;
embedding the classification model in a processor; and
receiving an image for categorisation, wherein the processor is in communication with a Point-of-Sale (POS) system, the processor running the classification model on the received image to provide output to the POS system of a prediction of the image's categorisation.

2. The method of claim 1 wherein in pre-processing, a pre-trained Convolution Neural Network (CNN) trained on large unrelated or separate data sets is used as a feature detector.

3. The method of claim 2 wherein extracting the feature vectors further includes determining texture features and performing dominant colour segmentation.

4. The method of claim 1 wherein the neural network comprises a Fully-Connected Neural Network.

5. The method of claim 1 wherein the POS system receives formatted communication of output by the classification model, the formatted output comprising a protocol for providing scores for a percentage likelihood of the image's category to the POS system.

6. The method of claim 1 further comprising blending at least one of the original images of items or the images of the masked item image set with at least one image of a bag texture prior to extracting feature vectors from the training image set in order to simulate semi-translucent packaging.

7. An item recognition system external to a Point-of-Sale (POS) system wherein the external system comprises:
a processor configured for running a classification model, the classification model having been developed by, in pre-processing:
receiving a plurality of images of backgrounds in which items are to be recognised as a background image set,
receiving a number of original images of items to be recognised in an original item image set,
masking the background of the original images in the original item image set to generate a masked item image set,
digitally augmenting the masked item image set to generate an augmented masked item image set that includes a larger number of images of masked items than the masked item image set,
superimposing each image of the augmented masked item image set on each of the images of the background image set to generate a plurality of new training images as part of a training image set, the training image set thereby providing quantitative variation to train a neural network;
extracting feature vectors from the training image set to generate the classification model by training the neural network on the training image set and the extracted feature vectors, wherein extracting the feature vectors includes determining texture features; and
the processor being further configured for:
running the classification model embedded in the processor to provide as output a prediction of the image's category; and
generating a formatted communication as output comprising a protocol to the POS system, wherein the POS system receives the formatted communication of the output by the classification model of the external system.

8. The system of claim 7 wherein the classification model provides a percentage likelihood of the image's categorisation.

9. The system of claim 8 wherein in pre-processing, the neural network comprises a pre-trained Convolution Neural Network (CNN) trained on large unrelated or separate data sets and is used as a shape and edge detector.

10. The system of claim 9 wherein extracting the feature vectors further includes calculating a colour space histogram and performing dominant colour segmentation.

11. The system of claim 8 wherein the neural network comprises a Fully-Connected Neural Network.

12. A method for generating a categorisation model for categorising items, comprising:
receiving a plurality of images of backgrounds in which items are to be recognised as a background image set;
receiving a number of original images of items to be recognised in an original item image set;
masking the background of the images in the original item image set to generate a masked item image set;
digitally augmenting the masked item image set to generate an augmented masked item image set that includes a larger number of images of masked items than the masked item image set;
superimposing each image of the augmented masked item image set on each of the images of the background image set to generate a plurality of new training images as part of a training image set to thereby provide sufficient quantitative variation to train a neural network;
feature vector extracting from the training image set wherein the feature vector extracting comprises running a pre-trained Convolution Neural Network (CNN) as a high-level edge and shape identifier, wherein the feature vector extracting includes performing dominant colour segmentation; and
generating a classification model by processing the image training set and the feature vectors extracted by the neural network wherein the classification model provides a prediction of an image's categorisation.

13. The method of claim 12 wherein generating the classification model further comprises pre-processing feature vector extraction of the images in the training image set.

14. The method of claim 12 wherein the feature vector extracting further includes calculating a colour space histogram and determining texture features.

15. The method of claim 12 wherein the neural network comprises a Fully-Connected Neural Network.

16. The method of claim 12 wherein the classification model is embedded in a processor that is external to a POS system and which is in communication with the POS system.

17. The method of claim 16 wherein the method includes transmitting formatted communication of output by the classification model to the POS system, the formatted output comprising a protocol for providing scores for a percentage likelihood of the image's category to the POS system.

18. A method for expanding an image data set, comprising:
in pre-processing:
receiving a plurality of images of settings in which items are to be recognised as a background image set;
receiving a number of original images of items to be recognised in an original item image set;
masking the background of the images in the original item image set to generate a masked item image set;
digitally augmenting the masked item image set to generate an augmented masked item image set that includes a larger number of masked images of the items than the masked item image set;
superimposing each of the images of the augmented masked item image set on each of the images of the background image set to generate a plurality of new training images as part of a training image set, the training image set thereby providing sufficient quantitative variation to train a neural network;
extracting feature vectors from the training image set, wherein extracting the feature vectors includes calculating a colour space histogram and at least one of determining texture features and performing dominant colour segmentation; and processing the training image set and the extracted feature vectors by the neural network to generate a classification model for deployment;

wherein segmentation of an image is not performed at deployment.

19. The method of claim 18 wherein at deployment, the method comprises capturing an image, extracting at least one feature from the image, and applying the extracted feature to the neural network of the classification model to generate a prediction of the image's categorisation.

20. The method of claim 18 wherein in pre-processing, the feature vector extraction is carried out by a pre-trained Convolution Neural Network (CNN) trained on large unrelated or separate data sets and is used as a shape and edge detector.

21. The method of claim 18 wherein the neural network comprises a Fully-Connected Neural Network.

22. The method of claim 18 wherein for deployment, the classification model is embedded in a processor that is external to a POS system and which is in communication with the POS system.

23. The method of claim 22 wherein the POS system receives formatted communication of output by the classification model, the formatted output comprising a protocol for providing scores for a percentage likelihood of the image's category to the POS system.

24. A method of image categorisation, comprising:

receiving a plurality of images of settings in which items are to be recognised as a background image set;

receiving a number of original images of items to be recognised in an original item image set;

masking the background of the images in the original item image set to generate a masked item image set;

digitally augmenting the masked item image set to generate an augmented masked item image set that includes a larger number of images of masked items than the masked item image set;

superimposing each image of the augmented masked item image set on each of the images of the background image set to generate a plurality of new training images as part of a training image set to thereby provide quantitative variation to train a neural network;

extracting feature vectors from the training image set by including one or more selected from the steps of:

a. calculating a colour space histogram;

b. determining texture features; and c. performing dominant colour segmentation, and training the neural network on the training image set and the feature vectors extracted to generate a classification model wherein the classification model provides a prediction of an image's categorisation.

25. The method of claim 24, further comprising:

embedding the classification model in a processor; and receiving an image for categorisation, wherein the processor is in communication with a POS system, the processor running the classification model to provide output to the POS system of a percentage likelihood of the image's categorisation.

26. The method of claim 25 wherein the POS system receives formatted communication of output by the classification model, the formatted output comprising a protocol for providing scores for the percentage likelihood of the image's category to the POS system.

* * * * *